United States Patent
Izawa et al.

(10) Patent No.: US 8,981,225 B2
(45) Date of Patent: Mar. 17, 2015

(54) SHIELD CONDUCTOR

(75) Inventors: Katsutoshi Izawa, Mie (JP); Masanori Kuwahara, Mie (JP); Fujio Sonoda, Mie (JP); Yasushi Itani, Mie (JP); Yoshinori Sugimoto, Mie (JP); Naoki Aoyama, Mie (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/979,732

(22) PCT Filed: Feb. 23, 2012

(86) PCT No.: PCT/JP2012/054362
§ 371 (c)(1),
(2), (4) Date: Jul. 15, 2013

(87) PCT Pub. No.: WO2012/117925
PCT Pub. Date: Sep. 7, 2012

(65) Prior Publication Data
US 2013/0299234 A1 Nov. 14, 2013

(30) Foreign Application Priority Data
Feb. 28, 2011 (JP) ................................. 2011-041712

(51) Int. Cl.
*H01B 9/02* (2006.01)
*H02G 3/00* (2006.01)
(Continued)

(52) U.S. Cl.
CPC ............... *H02G 3/0406* (2013.01); *H02G 3/06* (2013.01); *H02G 3/0468* (2013.01); *H02G 3/0481* (2013.01)

USPC ................... 174/102 R; 174/70 R; 174/74 R; 174/78; 174/102 D

(58) Field of Classification Search
USPC ................. 174/70 R, 74 R, 78, 102 D, 102 R
See application file for complete search history.

(56) References Cited

U.S. PATENT DOCUMENTS 3,778,535 A * 12/1973 Forney, Jr. .................. 174/88 C
(Continued)

FOREIGN PATENT DOCUMENTS

JP 51-128021 10/1976
(Continued)

OTHER PUBLICATIONS

International Search Report, mail date is May 22, 2012.

*Primary Examiner* — Timothy Thompson
*Assistant Examiner* — Sherman Ng
(74) *Attorney, Agent, or Firm* — Greenblum & Bernstein, P.L.C.

(57) ABSTRACT

A shield conductor includes: an electrical wire; a tubular shield member that encloses the electrical wire and is configured such that an end portion of a pipe made of metal is fit to an end portion of a tubular accordion member made of metal; a swage ring that is attached at a portion where the end portion of the pipe is fit to the end portion of the tubular accordion member, and constricts the end portion of the pipe and the end portion of the tubular accordion member from outside; a conductor ring that is arranged between the pipe and the tubular accordion member, has an inner circumferential face that faces the pipe and an outer circumferential face that faces the tubular accordion member, and has electrical conductivity; and a plurality of protrusion/recession portions formed on the inner circumferential face and the outer circumferential face.

6 Claims, 5 Drawing Sheets

(51) Int. Cl.
*H02G 15/04* (2006.01)
*H02G 15/02* (2006.01)
*H01B 7/20* (2006.01)
*H02G 3/04* (2006.01)
*H02G 3/06* (2006.01)

(56) References Cited

U.S. PATENT DOCUMENTS 5,994,646 A * 11/1999 Broeksteeg et al. ........ 174/74 R
6,815,617 B1 * 11/2004 Gebs et al. .............. 174/113 AS
7,247,795 B2 * 7/2007 Sumi et al. ................. 174/74 R
2004/0099427 A1 5/2004 Kihira
2009/0308632 A1 * 12/2009 Watanabe ................ 174/106 R

FOREIGN PATENT DOCUMENTS

| | | |
|---|---|---|
| JP | 62-55398 | 4/1987 |
| JP | 06-159562 | 6/1994 |
| JP | 2000-115951 | 4/2000 |
| JP | 2002-271082 | 9/2002 |
| JP | 3909763 | 2/2007 |

* cited by examiner

SHIELD CONDUCTOR

TECHNICAL FIELD

The present invention relates to a shield conductor.

BACKGROUND ART

Conventionally, in vehicles such as hybrid automobiles and electric automobiles, a shield conductor having a shield function is used when interconnecting devices such as inverters and motors, and a known example of a shield conductor is disclosed in Patent Document 1. This shield conductor includes multiple electrical wires and a tubular shield means that encloses all of the electrical wires, and the shield means is configured such that a connection pipe, a tubular braided member, and a shield shell are connected to both ends of a metal pipe in the stated order. When the shield shells located at the two end portions of the shield means are fixed to shield cases in which devices such as an inverter are accommodated, the entire circumference of the electrical wires connecting the devices can be enclosed by the shield shells.

CITATION LIST

Patent Documents

Patent Document 1: JP 3909763B

SUMMARY OF INVENTION

Technical Problem

However, according to this configuration, the tubular braided member is obtained by braiding thin metal wires into a mesh, which makes it easy for it to get caught on a peripheral member during attachment work and the like, thus reducing work efficiency, and there is also the risk of a reduction in shield performance if the tubular braided member is ripped.

The present invention was achieved in light of the above-described situation, and an object thereof is to provide a shield conductor that is superior in terms of the ease of arrangement work and can improve shield performance.

Solution to Problem

One aspect of the present invention is a shield conductor including: an electrical wire; a tubular shield member that encloses the electrical wire and is configured such that an end portion of a pipe made of metal is fit to an end portion of a tubular accordion member made of metal; a constricting member that is attached at a portion where the end portion of the pipe is fit to the end portion of the tubular accordion member, and constricts the end portion of the pipe and the end portion of the tubular accordion member from outside; a conductor ring that is arranged between the pipe and the tubular accordion member, has an inner circumferential face that faces the pipe and an outer circumferential face that faces the tubular accordion member, and has electrical conductivity; and a plurality of protrusion/recession portions formed on the inner circumferential face and the outer circumferential face.

According to this configuration, superior ease of arrangement work and improved shield performance can be achieved in comparison with the case where braided wire such as a tubular braided member, which is obtained by braiding thin metal wires into a mesh, is integrated in an end portion of a metal pipe, for example, as in conventional technology.

Specifically, if braided wire having superior flexibility, for example, is used in the portion of the shield member where the pipe and a device or the like are connected, the thin metal wires easily become frayed at the end portion of the braided wire. For this reason, the frayed thin metal wires easily become caught on a peripheral member during attachment work and the like, and there is the risk of a reduction in workability. Also, braided wire configured from thin metal wires easily rips, and there is the risk of a reduction in shield performance if it rips.

In contrast to this, according to the present invention, instead of braided wire, the tubular accordion member is connected to the pipe. Due to using a member obtained by working a metal foil or other thinly drawn out metal into an accordion-like shape as the tubular accordion member, for example, the end portions thereof do not fray. As a result, the tubular accordion member does not become caught on a peripheral member during attachment work or the like, thereby making it possible to have superior ease of arrangement work.

Additionally, the tubular accordion member made of a metal foil or the like is sturdier and less easily ripped than braided wire. In other words, due to having superior durability, it is possible to reliably prevent interference between the inserted electrical wires and foreign objects, and protect them from other peripheral members. Furthermore, due to using the tubular accordion member that has superior durability, it is possible to achieve shield performance compliant with the metal pipe, thereby enabling an improvement in the shield performance as a shield conductor.

Also, the pipe and the tubular accordion member are electrically connected via the conductor ring that is arranged between the pipe and the tubular accordion member. Also, multiple protrusion/recession portions are formed on the inner circumferential face of the conductor ring that faces the pipe and the outer circumferential face of the conductor ring that faces the tubular accordion member. Accordingly, even if an oxide layer is formed on the outer surface of the pipe or the inner surface of the tubular accordion member, the oxide layer will be broken when pressed by the protrusion/recession portions, thus establishing a favorable electrical connection state between the pipe and the conductor ring and between the conductor ring and the tubular accordion member, and improving shield performance and the reliability of the connection with the pipe and the tubular accordion member.

Specifically, first, if multiple protrusion/recession portions are provided on the inner circumferential face of the conductor ring that faces the pipe, the protrusion/recession portions dig into the pipe when constricted from the outside by the constricting member, and even if an oxide film is formed on the outer surface of the pipe, the oxide film will be broken, and the electrical connection state between the conductor ring and the pipe will be favorable. Also, if multiple protrusion/recession portions are also provided on the outer circumferential face of the conductor ring that faces the tubular accordion member, the protrusion/recession portions dig into the inner surface of the tubular accordion member when constricted from the outside by the constricting member, and the electrical connection state between the conductor ring and the tubular accordion member will similarly be favorable. As a result, it is possible to improve shield performance with respect to the electrical wires inserted into the pipe.

The following modes are preferable as modes for implementing the present invention.

It is desirable that the conductor ring is shaped as a C-ring obtained by bending a metal plate so as to be shaped as a circular arc. In order for the pipe and the tubular accordion member to be constricted by the constricting member from the outside with the conductor ring therebetween, first, the conductor ring, which is held on the pipe and covered by the tubular accordion member, needs to be constricted from directly above with the constricting member. At this time, if the conductor ring is shaped as a C-ring, it is possible to appropriately change the position of the conductor ring in conformity with the constricting member and the tubular accordion member even after it is held on the pipe. In other words, if the conductor ring is shaped as an O-ring, it needs to be pressed against at least the pipe due to being a conductor ring having protrusion/recession portions that dig into the pipe and the tubular accordion member, and therefore it is difficult to conceive of the position of the conductor ring being able to be changed after being held on the pipe. In contrast, if the conductor ring is shaped as a C-ring, it is possible to reduce the diameter of the conductor ring at the same time as constriction with the constricting member, and to cause the protrusion/recession portions to dig into the pipe and the tubular accordion member. Accordingly, if the conductor ring is shaped as a C-ring, and the inner diameter is set to a dimension that is sufficiently larger than the outer diameter of the pipe so as to allow its position to be changed, the position can be changed even after the conductor ring is held on the pipe, thus achieving superior workability.

It is desirable that the plurality of protrusion/recession portions are formed by a plurality of grooves that form a lattice. This configuration enables forming the plurality of protrusion/recession portion at the same time using knurling work, for example, and thus is superior in terms of formability.

Also, forming a plurality of grooves that form a lattice is, in other words, the formation of multiple rectangular protrusions, and therefore the multiple protrusions dig into the pipe and the tubular accordion member that face the conductor ring, thus making it possible to increase the fixing force of fixation to the pipe and the tubular accordion member. Additionally, due to the protrusions digging into the pipe and the tubular accordion member, it is possible to secure a large surface area of contact that the conductor ring has with the pipe and the tubular accordion member, thus enabling suppressing contact resistance and further securing sufficient connection reliability.

The tubular accordion member may be provided with a slit cut from an open end of the tubular accordion member in a portion that is fit to the outside of the pipe. A drawback of the tubular accordion member is that it less readily undergoes deformation than braided wire. In contrast to this, a slit is provided in the portion that is fit to the outside of the pipe, thus enabling the diameter to be easily reduced to conform to the outer diameter of the pipe even when constricting it from the outside with the constricting member. This makes it possible to achieve superior ease of attachment work.

A cylindrical connection portion that conforms to the outer circumferential face of the conductor ring may be formed in a portion of the tubular accordion member that is fit to the outside of the pipe. According to this configuration, the portion of the tubular accordion member that is fit to the outside of the pipe is given a cylindrical shape in advance, thus having superior workability compared to the case of having an accordion-like shape. Specifically, when the pipe and the tubular accordion member are constricted by the constricting member with the conductor ring therebetween, if the site of the tubular accordion member that directly comes into contact with the conductor ring is the cylindrical connection portion that conforms to the outer circumferential face of the conductor ring, there will be no positional displacement of the tubular accordion member relative to the conductor ring before and after constriction. This enables reliably constricting the tubular accordion member to the pipe with the conductor ring therebetween, and enables achieving superior workability. Also, by giving the constricting portion a shape that conforms to the outer circumferential face of the conductor ring, more surface area of contact with the conductor ring is secured, thus enabling suppressing contact resistance and achieving sufficient electrical connection.

The tubular accordion member may be provided with a seal tube portion that forms an annular gap with the pipe by expanding the cylindrical connection portion with a step in a portion that is continuous with the cylindrical connection portion, and a seal ring may be arranged between the pipe and the seal tube portion. This configuration enables preventing the intrusion of water, entrance of foreign objects, and the like from the outside via the portion where the pipe and the tubular accordion member are constricted.

Advantageous Effects of Invention

According to the present invention, it is possible to provide a shield conductor that is superior in terms of the ease of arrangement work and can improve shield performance.

DESCRIPTION OF EMBODIMENTS

Embodiment 1

The following describes Embodiment 1 of the present invention with reference to FIGS. 1 to 4.

A shield conductor 10 of the present embodiment is arranged between devices such as a battery, an inverter, and a motor (not shown) that configure the power source for traveling in a vehicle such as an electric automobile. The shield conductor 10 is configured so as to include two electrical wires 11 when arranged between a battery and an inverter, and include three electrical wires 11 when arranged between an inverter and a motor. The present embodiment describes a shield conductor 10 that is arranged between an inverter and a motor under the floor of a vehicle and includes three electrical wires 11.

Figure 1:
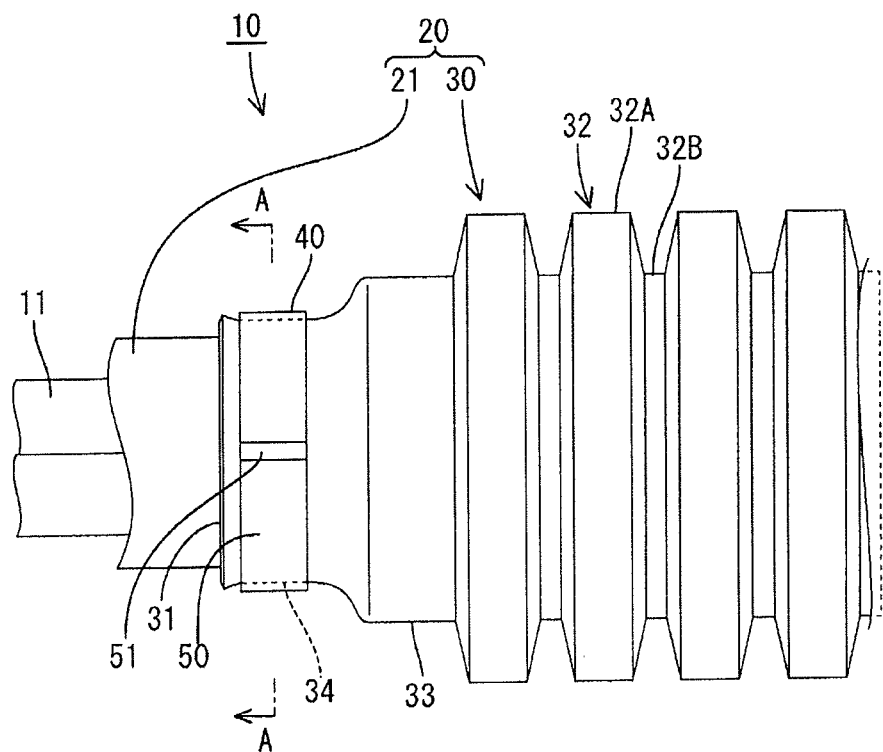
FIG. 1 is a side view of a connection portion for connecting a tubular accordion member and a pipe of a shield conductor according to Embodiment 1 of the present invention.
Figure 2:
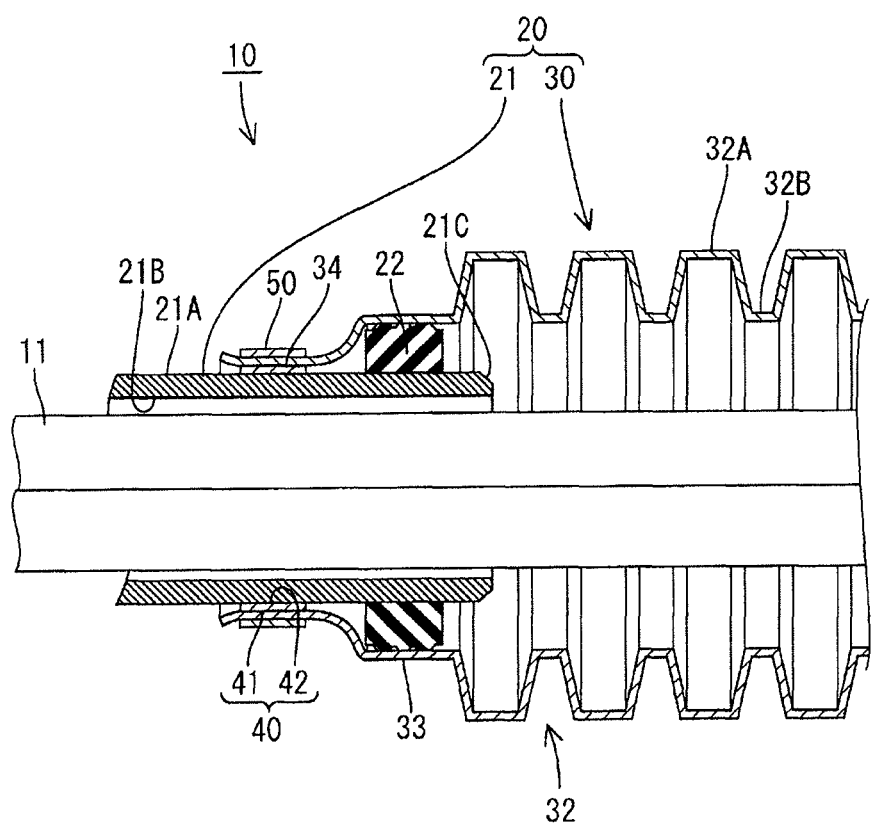
FIG. 2 is a lateral cross-sectional view of the same.
Figure 3:
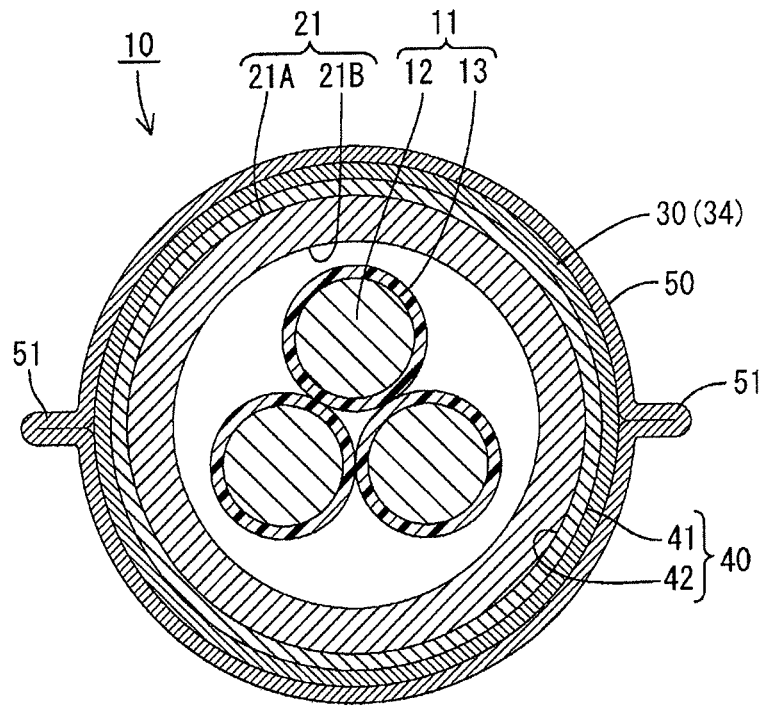
FIG. 3 is a cross-sectional view taken along A-A in FIG. 1.

As shown in FIGS. 1 to 3, the shield conductor 10 is configured by three electrical wires 11 and a shield member 20 that has a shield function and into which the three electrical wires 11 are inserted. The shield member 20 is configured so as to include a pipe 21 that is arranged under the floor of the vehicle, and a tubular accordion member 30. The tubular accordion member 30 has superior flexibility, is connected to each end portion of the pipe 21 in a conductible manner, and is for connecting the pipe 20 to devices.

Each electrical wire 11 is a round (having a circular cross section) covered electrical wire, and as shown in FIG. 3, is configured from a core wire 12 and an insulating sheath 13 (insulation layer) that encompasses the core wire 12. The core wire 12 is made of copper or a copper alloy, and is a single core wire or a twisted wire obtained by twisting together multiple metal wires. A terminal fixture (not shown) is connected to each end of the three electrical wires 11, and the electrical wires 11 are drawn out from the pipe 21 and the tubular accordion member 30 that is continuous with the pipe 21, for connection to a terminal on the device side.

The pipe 21 is made of metal (e.g., aluminum or an aluminum alloy), is cylindrical, and has an inner diameter that allows the insertion of the three electrical wires 11. Specifically, the pipe 21 has a cross-sectional shape that is a true circle as shown in FIG. 3, and an outer circumferential face 21A and an inner circumferential face 21B are shaped as concentric circles, that is to say, the thickness of the pipe 21 is constant over the entire circumference. Also, the outer circumferential face 21A of the pipe 21 is a smooth arc-shaped surface. As shown in FIG. 2, a guiding inclined face 21C inclined such that the diameter decreases in the rearward direction from the outer circumferential face 21A is formed in the edge portion of the opening of the pipe 21. The guiding inclined face 21C allows the pipe 21 to be easily inserted into an O-ring 22 (corresponding to a seal ring) that is fitted around the pipe 21, and into the tubular accordion member 30 that encompasses the O-ring 22. Besides the shield function, the pipe 21 configured in this way also has a function of protecting the electrical wires 11, and is suited to the case of being arranged under the floor of a vehicle, where there is the risk of the electrical wires 11 being damaged due to being hit by flying rocks or the like.

The end portion of the pipe 21 is fitted into the end portion of the tubular accordion member 30. Specifically, the end portion of the pipe 21 is inserted into the tubular accordion member 30 through an open end 31 thereof. In other words, the end portion of the tubular accordion member 30 is arranged so as to be outward of the end portion of the pipe 21 with respect to the diameter direction of the pipe 21. Furthermore, a swage ring 40 (corresponding to a constricting member) is swaged from the outside at the portion where the end portion of the pipe 21 and the end portion of the tubular accordion member 30 are fitted together. The pipe 21 and the tubular accordion member 30 are thus electrically connected.

The tubular accordion member 30 is made of metal (e.g., copper or a copper alloy, which are superior in terms of flexibility) likewise to the pipe 20, and is formed into a thin-film accordion-like shape. As shown in FIGS. 1 to 3, the tubular accordion member 30 is substantially cylindrical overall, and the portion thereof formed into an accordion-like shape is a main portion 32. As shown in FIG. 2, between the main portion 32 and the open end 31, a seal tube portion 33 and a cylindrical connection portion 34 are provided in the stated order from the main portion 32 side. As will be described in detail later, the seal tube portion 33 corresponds to a site where it encompasses the circumference of the O-ring 22, which is fitted onto the pipe 21, from the outside in close contact, and the cylindrical connection portion 34 corresponds to a site where the pipe 21 is swaged from the outside by the swage ring 50 via a conductor ring 40 held on the pipe 21.

Convex portions 32A of the main portion 32 that expand outward and extend in the circumference direction are arranged in parallel with a predetermined regular pitch along the axial direction. Portions between the convex portions 32A are concave portions 32B that bulge inward, and the convex portions 32A and the concave portions 32B are arranged alternatingly so as to form an accordion-like shape, thus achieving flexibility so as to be able to flexibly follow the path along which the electrical wires 11 are to be arranged.

The seal tube portion 33 is formed so as to increase in diameter from the cylindrical connection portion 34 with a step, and forms an annular gap equal to the thickness of the O-ring 22 with the outer circumferential face 21A of the pipe 21. As shown in FIG. 2, this gap can accommodate the O-ring 22 when it is fitted around the outer circumferential face 21A of the pipe 21. The O-ring 22 is configured by an elastic body such as rubber, and forms a water-tight seal between the inner circumferential face of the seal tube portion 33 and the outer circumferential face 21A of the pipe 21 due to being in close contact with them.

The cylindrical connection portion 34 is formed along the outer circumferential face 41 of the conductor ring 40 with substantially the same dimension as the outer diameter of the conductor ring 40 from the open end 31. The outer circumferential face of the cylindrical connection portion 34 is a smooth arc-shaped surface, and allows the mounting of the later-described swage ring 50 from the outside.

Figure 4:
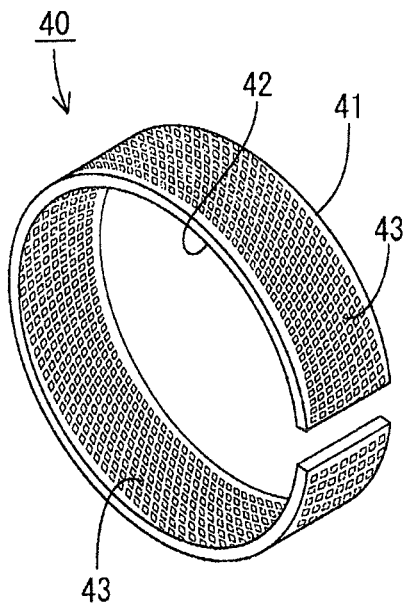
FIG. 4 is a perspective view of a conductor ring.

On the outer circumferential face 21A of the pipe 21, the conductor ring 40 that is held so as to be parallel with the O-ring 22 is formed by bending a conductive metal plate made of aluminum, an aluminum alloy, copper, a copper alloy, or the like into a circular arc, and the overall shape of the conductor ring 40 is a C-ring shape as shown in FIG. 4. The inner diameter of the conductor ring 40 is somewhat larger than the outer diameter of the pipe 21, and is set to a dimension that allows the conductor ring 40 to be inserted into the pipe 21 and be moved.

The conductor ring 40 has an outer circumferential face 41 as the face that faces the cylindrical connection portion 34 of the tubular accordion member 30, and an inner circumferential face 42 as the face that faces the outer circumferential face 21A of the pipe 21. Serrations 43 (corresponding to protrusion/recession portions) are formed on the outer circumferential face 41 and the inner circumferential face 42. The serrations 43 are formed by performing so-called knurling work, and due to multiple grooves forming a lattice being formed in a continuous manner, many projections having a parallelogram shape are aligned along a predetermined direction at a predetermined interval. Note that the predetermined direction is a direction that obliquely crosses the width direction of the conductor ring 40, that is to say, the axial direction of the pipe 21.

The swage ring 50 that swages the cylindrical connection portion 34 to the pipe 21 with the conductor ring 40 therebetween is made of metal (e.g., an aluminum alloy, stainless steel, copper, or a copper alloy), and is ring-shaped. The swage ring 50 is shaped as a band plate that extends along the axial direction of the swage ring 50, and the width dimension substantially conforms to the width dimension of the conductor ring 40 and the cylindrical connection portion 34 of the tubular accordion member 30. The inner diameter of the swage ring 50 is larger than the outer diameter of the pipe 21 before swaging.

The following describes an example of the process by which the swage ring 50 is used to constrict the tubular accordion member 30 around the pipe 21 with the conductor ring 40 therebetween.

First, the conductor ring 40 is mounted on the pipe 21, and then the O-ring 22 is fitted onto the pipe 21. The pipe 21, on which the conductor ring 40 and the O-ring 22 are held, is then inserted into the tubular accordion member 30, beginning with the guiding inclined face 21C. The pipe 21 is pushed forward until the O-ring 22 reaches a position where it is accommodated in the seal tube portion 33 of the tubular accordion member 30, and when the O-ring 22 forms a seal by being in close contact with the inner circumferential face of the seal tube portion 33 and the outer circumferential face 21A of the pipe 21, it is checked whether the cylindrical connection portion 34 and the conductor ring 40 overlap each other at the constricting position, and the swage ring 50 is fit directly above the constricting position. At this time, the positional relationship is such that the pipe 21, the conductor ring 40, the cylindrical connection portion 34 of the tubular accordion member 30, and the swage ring 50 are substantially concentric in order from the axial center side.

The pipe 21, the conductor ring 40, the tubular accordion member 30, and the swage ring 50 are set in a swage mold (not shown) in this state. When the mold is clamped, the swage ring 50 is pressed toward the cylindrical connection portion 34 of the tubular accordion member 30, and the cylindrical connection portion 34 is pressed against the conductor ring 40 so as to be embedded in the serrations 43 formed on the outer circumferential face 43. The diameter of the conductor ring 40 also decreases along the outer circumferential face 21A of the pipe 21, and serrations 43 formed on the inner circumferential face 42 that faces the outer circumferential face 21A of the pipe 21 dig into the pipe 21. At the same time, the surplus length portion of the swage ring 50 protrudes outward so as to form a pair of left and right ear portions 51 as shown in FIG. 3. These ear portions 51 have a folded back shape in which portions of the inner circumferential face of the surplus length portion are in close contact with each other. The portion other than the ear portions 51 has an overall substantially circular shape according to which the outer circumferential face 21A of the pipe 21, the conductor ring 40, and the cylindrical connection portion 34 of the tubular accordion member 30 are in close contact with each other, and of course the portion of the swage ring 50 other than the ear portions 51 is in close contact with the cylindrical connection portion 34 from the outside. In this way, by swaging these portions from the outside with the swage ring 50, the conductor ring 40 and the tubular accordion member 30 are uniformly fastened to the pipe 21. At the same time, the serrations 43 formed on the outer circumferential face 41 and the inner circumferential face 42 of the conductor ring 40 dig into the outer circumferential face 21A of the pipe 21 and the inner circumferential face of the cylindrical connection portion 34 of the tubular accordion member 30, which they face. Accordingly, the pipe 21 and the tubular accordion member 30 are forcibly fixed to each other via the conductor ring 40, thus securing connection reliability.

As described above, according to the present embodiment, with the shield member 20 that encloses the electrical wires 11, the metal tubular accordion member 30 is fit onto the metal pipe 21 via the metal conductor ring 40, and the pipe 21 and the tubular accordion member 30 are connected due to be swaged from the outside with the swage ring 50. Accordingly, it is possible to have superior ease of arrangement work and improved shield performance compared to the case of integrating braided wire such as a tubular braided member as in conventional technology.

Specifically, since braided wire is formed by braiding thin metal wires into a mesh, the thin metal wires easily become frayed, especially at the ends of the braided wire. The frayed thin metal wires easily become caught on a peripheral member during attachment work and the like, and there is the risk of a reduction in workability. Similarly, braided wire configured from thin metal wires also easily rips, and there is the risk of a reduction in shield performance if it rips.

In contrast, according to the present embodiment, instead of braided wire, the tubular accordion member 30, which is formed into a thin-foil according-like shape, is connected to the pipe 21, thus preventing fraying at its ends and eliminating the risk of the tubular accordion member 30 becoming caught on a peripheral member during attachment work or the like. This makes it possible to have superior ease of arrangement work.

Also, since the tubular accordion member 30 is foil-shaped overall, it is sturdier and less easily ripped compared to braided wire obtained by braiding thin metal wires. In other words, since the tubular accordion member 30 has superior durability, it is possible to reliably prevent interference between the inserted electrical wires 11 and foreign objects, and protect them from other peripheral members. Additionally, due to using the sturdy tubular accordion member 30 that is not easily ripped, it is possible to achieve shield performance compliant with the metal pipe 21, thereby enabling an improvement in the overall shield performance of the shield member 20. Also, since the main portion 32 of the tubular accordion member 30 has an accordion-like shape due to alternatingly arranging the convex portions 32A and the concave portions 32B, the tubular accordion member 30 can flexibly follow the path along which the electrical wires 11 are to be arranged.

Also, since the tubular accordion member 30 is constricted via the conductor ring 40 held on the outer circumference of the pipe 21, it is possible to improve the reliability of the connection with the pipe 21 and the tubular accordion member 30. Specifically, the serrations 43 are formed on the inner circumferential face 42 of the conductor ring 40 that faces the outer circumferential face 21A of the pipe 21, and on the outer circumferential face 41 of the conductor ring 40 that faces the cylindrical connection portion 34 of the tubular accordion member 30. Accordingly, even if an oxide layer is formed on the outer circumferential face 21A of the pipe 21 or the inner circumferential face of the tubular accordion member 30, the oxide layer will be broken when pressed by the serrations 43, thus establishing a favorable electrical connection state between the pipe 21 and the tubular accordion member 30. This enables improving the reliability of the connection with the pipe 21 and the tubular accordion member 30, and improving shield performance.

More specifically, first, if serrations 43 configured by multiple protrusion/recession portions are provided on the inner circumferential face 42 of the conductor ring 40 that faces the outer circumferential face 21A of the pipe 21, when the conductor ring 40 is constricted from the outside by the swage ring 50, the serrations 43 will dig into the pipe 21, and even if an oxide film has formed on the outer surface of the pipe 21, the oxide film will be broken, and the electrical connection state between the conductor ring 40 and the pipe 21 will be favorable. Also, since the serrations 43 are, similarly to the inner circumferential face, also formed on the outer circumferential face 41 (outer surface) of the conductor ring 40 that faces the inner circumferential face of the tubular accordion member 30, when the conductor ring 40 is constricted from the outside by the swage ring 50, the serrations 43 will dig into the inner circumferential face (inner surface) of the tubular accordion member 30, and the electrical connection state between the conductor ring 40 and the tubular accordion member 30 will similarly be favorable. As a result, it is possible to improve shield performance with respect to the electrical wires 11 inserted into the pipe 21.

Also, the serrations 43 formed on the conductor ring 40 can be easily formed by knurling work. Also, since the serrations 43 are configured from multiple protrusions, when they dig into the pipe 21 and the tubular accordion member 30, a greater surface area of contact with the conductor ring 40 and the two members can be secured, thus making it possible to suppress contact resistance and further secure sufficient connection reliability.

Also, the serrations 43 are shaped such that the many protrusions shaped as parallelograms are aligned along a predetermined direction at a predetermined interval, and the predetermined direction is a direction that obliquely crosses the axial direction of the pipe 21, and therefore holding force for holding the pipe 21 and the tubular accordion member 30 together acts against the direction in which they attempt to separate (i.e., the axial direction of the pipe 21), thus making it possible to more forcibly connect the pipe 21 and the tubular accordion member 30.

Also, in the case where an oxide layer is formed on the surfaces of the pipe 21 and the tubular accordion member 30, if the pipe 21 and the tubular accordion member 30 are simply connected surface-to-surface using the swage ring 50, the pipe 21 and the tubular accordion member 30 would be electrically connected via that oxide layer, thus leading to the problem of a rise in contact resistance. However, with the present embodiment, the serrations 43 of the conductor ring 40 can dig into the pipe 21 and the tubular accordion member 30 and break through the oxide layers so as to come into contact with the inner conductor, thus making it possible to suppress contact resistance to a low level and sufficiently secure the reliability of the connection with the pipe 21 and the tubular accordion member 30. As described above, since the pipe 21 and the tubular accordion member 30 are swaged from the outside by the swage ring 50 with the conductor ring 40 therebetween, sufficient electrical connection can be obtained, thus enabling improving shield performance with respect to the electrical wires 11 inserted in the pipe 21.

Also, since the conductor ring 40 is shaped as a C-ring, by setting its dimension larger than the outer diameter of the pipe 21 so as to allow it to move relative to the pipe 21, even after the conductor ring 40 is held on the pipe 21, the position of the conductor ring 40 can be moved in conformity with the tubular accordion member 30 and the swage ring 50, thus enabling achieving superior ease of attachment work. Also, even if the inner diameter dimension of the conductor ring 40 is set so as to be larger than the outer diameter of the pipe 21 for the above reasons, the conductor ring 40 can be fixed to the pipe 21 by reducing the diameter in swaging, thus avoiding problems.

Also, since the cylindrical connection portion 34, which is arranged on the conductor ring 40 and is swaged by the swage ring 50, has a shape that conforms to the outer circumferential face 41 of the conductor ring 40, workability is superior compared to the case where, for example, the swage portion is also shaped as an accordion similarly to the main portion 32. Specifically, when the pipe 21 and the tubular accordion member 30 are constricted by the swage ring 50 with the conductor ring 40 therebetween, if the cylindrical connection portion 34 that directly comes into contact with the conductor ring 40 is shaped as a cylinder that conforms to the outer circumferential face 41 of the conductor ring 40, it is possible to make it unlikely for the tubular accordion member 30 to become displaced relative to the conductor ring 40 before and after swaging. This enables more reliably constricting the tubular accordion member 30 to the pipe 21 via the conductor ring 40, and enables achieving superior workability. Also, since the swage portion is shaped so as to conform to the outer circumferential face 41 of the conductor ring 40, a larger surface area of contact between the conductor ring 40 and the tubular accordion member 30 is secured, thus enabling suppressing contact resistance to a low level and achieving sufficient electrical connection.

Also, out of the portion where the pipe 21 and the tubular accordion member 30 overlap each other, the O-ring 22 is fitted onto the end portion of the pipe 21 arranged more toward the main portion 32 side of the tubular accordion member 30 than the cylindrical connection portion 34, which is the swage portion, is. For close contact with the O-ring 22, the tubular accordion member 30 is provided with the seal tube portion 33 whose diameter expands with a step from the cylindrical connection portion 34. Accordingly, the O-ring 22 forms a water-tight seal between the outer circumferential face 21A of the pipe 21 and the seal tube portion 33, thus making it possible to prevent the intrusion of water, entrance of foreign objects, and the like from the outside via gaps or the like between the cylindrical connection portion 34, which is swaged by the swage ring 50, and the conductor ring 40 or the outer circumferential face 21A of the pipe 21.

Although Embodiment 1 of the present invention has been described above, the present invention is not limited to the above embodiment, and can also include variations such as the following. Note that in the following variation, members similar to those of the above embodiment will be denoted by the same reference signs as in the above embodiment, and descriptions thereof will not be given.

Variation 1 of Embodiment 1

Figure 5:
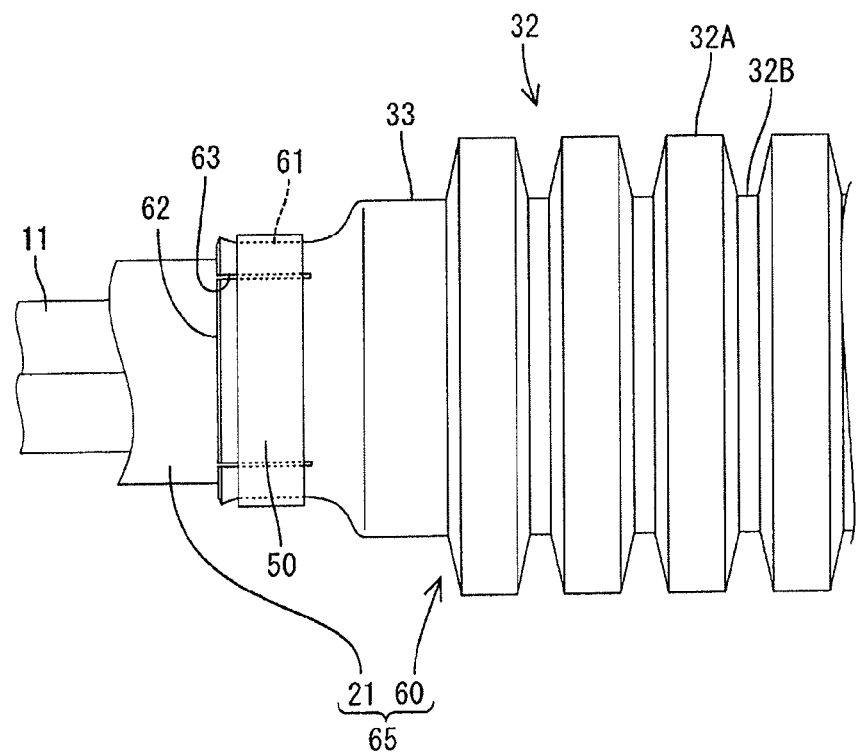
FIG. 5 is a side view of connection portion for connecting a tubular accordion member and a pipe of a shield conductor according to Variation 1 of Embodiment 1.

The following describes Variation 1 of Embodiment 1 with reference to FIG. 5. The present variation differs from Embodiment 1 in that multiple slits 63 are formed in a tubular accordion member 60.

Multiple (four in the present embodiment) slits 63 are cut into a cylindrical connection portion 61 of the tubular accordion member 60, beginning at an open end 62 and extending in the lengthwise direction of the cylindrical connection portion 61 (tubular accordion member 30). These slits 63 are formed in the cylindrical connection portion 61 at equal intervals in the circumferential direction of the open end 62. The length dimension of the slits 63 in the lengthwise direction of the cylindrical connection portion 34 is set such that the slits 63 begin at the open end 62, completely pass through the cylindrical connection portion 34, and reach a position before the increase in diameter toward the seal tube portion 33.

Compared with the case of not providing the slits 63 as in Embodiment 1, according to this configuration, it is possible to more easily reduce the diameter of the tubular accordion member 60 in conformity with the outer diameter of the pipe 21 when swaging it from the outside with the swage ring 50, thus enabling achieving superior ease of attachment work.

Also, providing the slits 63 in the cylindrical connection portion 61 enables achieving a configuration in which connection to the outer circumferential face 21A of the pipe 21 is easy. As a result, it is easy to secure the surface area of contact, and it is possible to suppress contact resistance and secure sufficient connection reliability. Even with this variation, it is possible to achieve more superior shield performance for the shield member 65 configured from the pipe 21 and the tubular accordion member 60.

Embodiment 2

Figure 6:
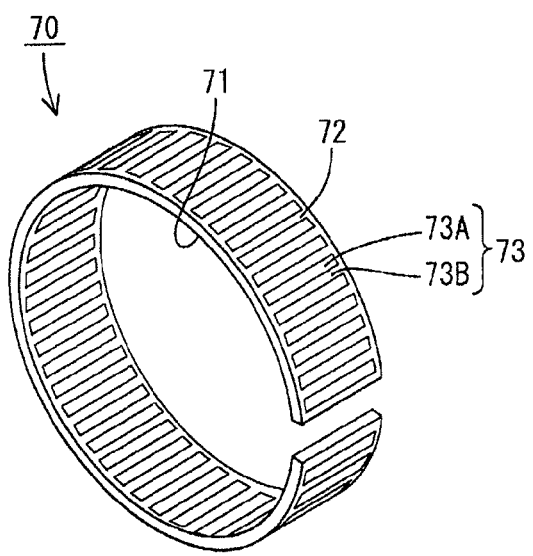
FIG. 6 is a perspective view of a conductor ring according to Embodiment 2.

The following describes Embodiment 2 of the present invention with reference to FIG. 6.

The present embodiment differs from Embodiment 1 with respect to the shape of serrations 73 of a conductor ring 70. Other configurations are similar to those in Embodiment 1, and descriptions thereof will not be given.

The serrations 73 are formed by alternatingly arranging a convex portion 73A and a concave portion 73B, which extend along the axial direction of the pipe 21, on an inner circumferential face 71 and an outer circumferential face 72 of the conductor ring 70.

According to this configuration, similarly to Embodiment 1, the serrations 73 dig into the pipe 21 and the tubular accordion member 30, thus forcibly fixing them to the conductor ring 70, thereby making it possible to secure the reliability of the connection between the pipe 21 and the tubular accordion member 30. Forcibly connecting the pipe 21 and the tubular accordion member 30 also enables improving shield performance with respect to the electrical wire 11 inserted therein.

Embodiment 3

Figure 7:
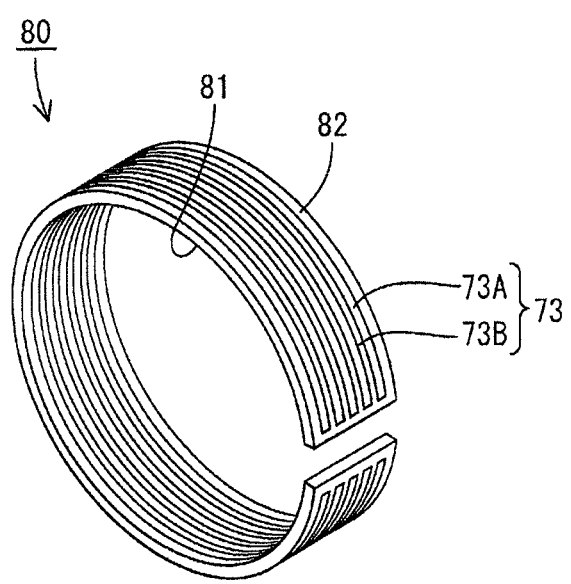
FIG. 7 is a perspective view of a conductor ring according to Embodiment 3.

The following describes Embodiment 3 of the present invention with reference to FIG. 7.

The present embodiment differs from Embodiment 1 and Embodiment 2 with respect to the shape of serrations 83 of a conductor ring 80. Other configurations are similar to those in Embodiment 1 and Embodiment 2, and descriptions thereof will not be given.

The serrations 83 are formed by alternatingly arranging a convex portion 83A and a concave portion 83B, which extend along the circumferential direction of the conductor ring 80, on an inner circumferential face 81 and an outer circumferential face 82 of the conductor ring 80, thus giving the serrations 83 the shape of protrusions and recessions.

According to this configuration, similarly to Embodiment 1 and Embodiment 2, the serrations 83 dig into the pipe 21 and the tubular accordion member 30, thus forcibly fixing them to the conductor ring 80, thereby making it possible to secure the reliability of the connection between the pipe 21 and the tubular accordion member 30. Forcibly connecting the pipe 21 and the tubular accordion member 30 also enables improving shield performance with respect to the electrical wire 11 inserted therein.

Other Embodiments

The present invention is not limited to the embodiments described by way of the above descriptions and figures, and embodiments such as the following are also encompassed in the technical scope of the present invention.

(1) Although the conductor rings 40, 70, and 80 in the above-described embodiments are shaped as C-rings, there is no limitation to this. A configuration is possible in which, for example, the conductor ring is fitted around the pipe before the tubular accordion member is swaged with the swage ring. According to this configuration, the pre-fixed conductor ring does not become misaligned when the tubular accordion member is swaged with the swage ring.

(2) Although the serrations 43, 73, and 83 are formed over substantially the entirety of the inner and outer circumferential faces of the conductor rings 40, 70, and 80 in the above-described embodiments, there is no limitation to this. They may be partially formed in only a portion that comes into contact with the pipe 21 and the tubular accordion member 30 or 60.

(3) Although the serrations 43 are formed by performing knurling work in Embodiment 1, there is no limitation to this. Any mode may be used as long as the shape of protrusions and recessions is achieved. For example, the protrusion/recession portions may be configured by forming curved grooves, recession portions whose outer shape is a polygon such as a triangle or a quadrangle, or recession portions whose outer shape is circular or oblong, for example.

(4) Although there are two or three electrical wires 11 in the above-described embodiments, there is no limitation to this. The number of electrical wires 11 may be one, or four or more.

(5) Although the cross-sectional shape of the pipe 21 is a true circle in the above-described embodiments, there is no limitation to this. The shape may be changed to a flattened shape such as an ellipse depending on the arrangement situation.

(6) Although the swage portion such as the outer circumferential face 21A of the pipe 21 and the cylindrical connection portion 34 of the tubular accordion member 30 are not subjected to plating processing or the like for the purpose of preventing rusting and electrical corrosion in the above-described embodiments, there is no limitation to this. Rust prevention may be achieved by performing zinc plating on end portions of the pipe 21. Also, electrical corrosion occurring due to contact with different types of metal may be suppressed by performing tin plating on portions of the face of the tubular accordion member 30 that come into contact with the pipe 21.

(7) Although the pipe 21 is made of a metal such as aluminum or an aluminum alloy, and the tubular accordion member 30 is made of a metal such as copper or a copper alloy, which are superior in terms of flexibility, in the above-described embodiments, there is no limitation to this. They may be configured by another metal material or a conductive material other than metal.

(8) Although the pipe 21 and the tubular accordion member 30 are conductively connected by swaging with the ring-shaped swage ring 50 in the above-described embodiments, there is no limitation to this. Swaging may be performed using a C-shaped swage ring, for example. Also, a mode is possible in which the pipe and tubular accordion member are constricted from the outside using a constricting member such as a tie band.

REFERENCE SIGNS LIST

10 Shield conductor
11 Electrical wire
20 Shield member
21 Pipe
22 O-ring (seal ring)
30 Tubular accordion member
31 Open end
32 Main portion
32A Convex portion
32B Concave portion
33 Seal tube portion
34 Cylindrical connection portion
40 Conductor ring
41 Outer circumferential face
42 Inner circumferential face
43 Serrations (protrusion/recession portions)
50 Swage ring (constricting member)

The invention claimed is:

1. A shield conductor comprising:
an electrical wire;
a tubular shield member that encloses the electrical wire and is configured such that an end portion of a pipe made of metal is fit to an end portion of a tubular accordion member made of metal;
a constricting member that is attached at a portion where the end portion of the pipe is fit to the end portion of the tubular accordion member, and constricts the end portion of the pipe and the end portion of the tubular accordion member from outside;

a conductor ring that is arranged between the pipe and the tubular accordion member, has an inner circumferential face that faces the pipe and an outer circumferential face that faces the tubular accordion member, and has electrical conductivity; and a plurality of protrusion/recession portions formed on the inner circumferential face and the outer circumferential face.

2. The shield conductor according to claim 1,
wherein the conductor ring is shaped as a C-ring obtained by bending a metal plate so as to be shaped as a circular arc.

3. The shield conductor according to claim 1,
wherein the plurality of protrusion/recession portions are formed by a plurality of grooves that form a lattice.

4. The shield conductor according to claim 1,
wherein the tubular accordion member includes a slit cut from an open end of the tubular accordion member in a portion that is fit to the outside of the pipe.

5. The shield conductor according to claim 1,
wherein a cylindrical connection portion that conforms to the outer circumferential face of the conductor ring is formed in a portion of the tubular accordion member that is fit to the outside of the pipe.

6. The shield conductor according to claim 5,
wherein the tubular accordion member is provided with a seal tube portion that forms an annular gap with the pipe by expanding the cylindrical connection portion with a step in a portion that is continuous with the cylindrical connection portion, and a seal ring is arranged between the pipe and the seal tube portion.

* * * * *